US007366916B2

(12) United States Patent
Gentle et al.

(10) Patent No.: US 7,366,916 B2
(45) Date of Patent: Apr. 29, 2008

(54) METHOD AND APPARATUS FOR AN ENCRYPTING KEYBOARD

(75) Inventors: Christopher Reon Gentle, Gladesville (AU); Julian James Orbach, Ryde (AU)

(73) Assignee: Avaya Technology Corp., Basking Ridge, NJ (US)

( * ) Notice: Subject to any disclaimer, the term of this patent is extended or adjusted under 35 U.S.C. 154(b) by 782 days.

(21) Appl. No.: 10/664,663

(22) Filed: Sep. 20, 2003

(65) Prior Publication Data

US 2005/0066186 A1    Mar. 24, 2005

(51) Int. Cl.
*H04L 9/00* (2006.01)
*G06F 21/00* (2006.01)
(52) U.S. Cl. ...................... 713/193; 713/167
(58) Field of Classification Search ................. 713/167
See application file for complete search history.

(56) References Cited

U.S. PATENT DOCUMENTS

2003/0159053 A1\* 8/2003 Fauble et al. ............... 713/189
2004/0117632 A1\* 6/2004 Arling et al. ............... 713/182

\* cited by examiner

*Primary Examiner*—Gilberto Barron
*Assistant Examiner*—Aubrey H Wyszynski
(74) *Attorney, Agent, or Firm*—John C. Moran

(57) ABSTRACT

A method and keyboard for protecting data generated by the keyboard by reading data from a keypad of the keyboard, encrypting the read data, and transmitting the encrypted data from the keyboard to a computer. A method for protecting by the computer data generated by a keyboard where the keyboard is connected to the computer by receiving encrypted data from the keyboard by the computer, and decrypting the encrypted data. A method for protecting by a server the data generated by a keyboard where the keyboard is connected to the server via a network and a computer by receiving encrypted data from the keyboard by the server, and decrypting the encrypted data.

14 Claims, 4 Drawing Sheets

METHOD AND APPARATUS FOR AN ENCRYPTING KEYBOARD

TECHNICAL FIELD

This invention relates to computer systems and, in particular, to the protection of personal information.

BACKGROUND OF THE INVENTION

Within the prior art, the problems of protecting personal or proprietary information have become increasingly important. Indeed, as the concepts of E-commerce have become more and more prevalent, the manner in which the proprietary or personal information is illegally obtained has increased. This is not only true of E-commerce being conducted over the Internet but also on Intranets within a commercial, governmental, or academic environment. One method that is used to obtain personal or proprietary information is the use of "keyboard-sniffers". Keyboard-sniffers are software or hardware based intrusions (also referred to as "bugs") that secretly record every keystroke on a computer and transmit/record it for later use by a third party who is illicitly gathering information. A keyboard-sniffer circumvents most password-protected encryption systems, by obtaining the personal or proprietary information before it can be encrypted. Software-based keyboard-sniffers can be manually installed on a computer system or may take the form of "virus" infestations being received from a network such as the Internet or Intranet.

One technique to protect against keyboard-sniffers is to attempt to prevent keyboard-sniffers from being installed in the first place. This attempt suffers from the problem that the software techniques utilized to insert sniffers/viruses into computer systems are constantly evolving. In addition, hardware based keyboard-sniffers can be installed on an unattended computer in only a couple of minutes since all that is necessary is to simply insert a small device between the keyboard and the computer. Also, with the growing number of wireless keyboards, it is not necessary to physically insert hardware between the keyboard and the computer. With respect to wireless keyboards, all that is necessary is to locate a receiver within the transmission range of the wireless keyboard.

A second technique that the prior art has attempted to utilize to circumvent keyboard-sniffers is to display numbers and letters on the console of a computer and have the user utilize the mouse to point out the password by touching various numbers and letters on the console screen.

A third technique that has been utilized by some password and entry programs is to display on the console screen randomized character mapping for a user to perform on their own password before the user enters the password.

A fourth technique is to insert a hardware device into a link interconnecting a keyboard and a computer. The hardware device automatically generates a different password each time the user logs onto the computer or a server via the computer. (See the application note entitled "Using KeeLoq to Generate Hopping Passwords". Application note AN665, Microchip Technology, Inc., 1997). These prior art techniques suffer from many problems including human factors, implementation, and limited use.

SUMMARY OF THE INVENTION

A method and keyboard for protecting data generated by the keyboard by reading data from a keypad of the keyboard, encrypting the read data, and transmitting the encrypted data from the keyboard to a computer.

A method for protecting by a computer data generated by a keyboard where the keyboard is connected to the computer by receiving encrypted data from the keyboard by the computer, and decrypting the encrypted data.

A method for protecting by a server data generated by a keyboard where the keyboard is connected to the server via a network and a computer by receiving encrypted data from the keyboard by the server, and decrypting the encrypted data.

DETAILED DESCRIPTION

Figure 1:
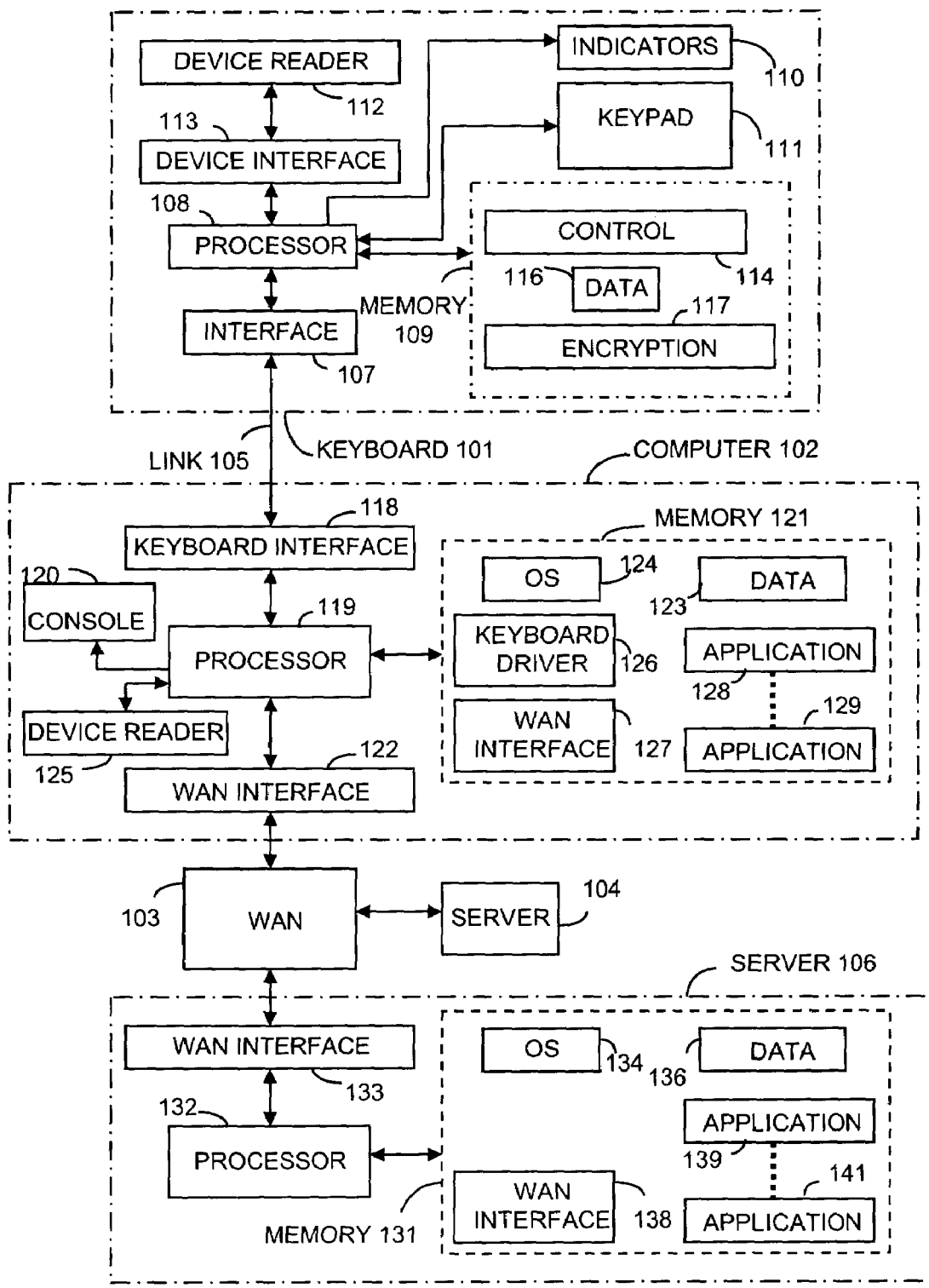
FIG. 1 illustrates, in block diagram form, various embodiments.

FIG. 1 illustrates, in block diagram form, various embodiments that may be utilized to implement the invention. Keyboard 101 comprises processor 108 which provides overall control of keyboard 101. Keypad 111 is the keypad that typing and data entry is performed on. Indicators 110 include various indication lights such as a "NUM LOCKS" indicator. Memory 109 provides storage for routines and data. Interface 107 interconnects keyboard 101 to computer 102. Link 105 interconnecting keyboard 101 and computer 102 can be implemented in various protocols including a wireless protocol.

In one embodiment, device reader 112 is utilized to read information from a security card or other such portable media. Device reader 112 may be a USB device, a PC card reader, or any other input device known to those skilled in the art. With the exception of device reader 112, the other elements of keyboard 101 are found in prior art keyboards. The difference between keyboard 101 and prior art keyboards is the manner in which control routine 114 and encryption routine 117 function.

Computer 102 may be any computer to which a keyboard is connected and is well known to those skilled in the art. Processor 119 provides overall control of computer 102 by the execution of programs and data stored in memory 121. Operating system 124 provides the overall software control. Keyboard driver 126 interfaces with information being received from keyboard 101. WAN interface 127 provides the necessary interface routines to interconnect to WAN 123 via WAN interface 122. Console 120 provides visual information to a user of computer 102.

In one embodiment, device reader 125 is utilized by processor 119 to read information from a security card or other such portable media. Device reader 125 may be a USB device, a PC card reader, or any other input device known to those skilled in the art. An embodiment utilizing both device readers 112 and 125 can encrypt and decrypt information being transmitted from keyboard 101 to computer 102 via link 105. The information being inputted via keypad 111 is encrypted using information read from device reader 112 before transmission over link 105 (which may be a wireless link) and decrypted by processor 119 utilizing information received from device reader 125.

Wide area network (WAN) 103 provides interconnection between computers such as computer 102 and servers 104-106. WAN 103 may be, but is not limited to, the Internet, Intranet, local area network, etc.

Servers 104-106 provide a variety of services for computers such as computer 102. Servers 104-106 may also provide a number of other services without communication with a computer such as computer 102, as is well known to those skilled in the art.

Server 106 illustrates more details concerning a server. Note, that server 106 does not illustrate certain devices such as, but is not limited to, a console, mass storage, keyboard, etc. Processor 132 provides overall control of server 106 by executing programs and using data stored in memory 131. Operating system 134 provides overall software control utilizing WAN interface 138 to communicate via WAN 103. Applications 139-141 can perform a variety of activities. In the following examples, it is assumed that application 139 is performing an application that requires input of personal or proprietary information from keyboard 101 via computer 102.

Consider now the various embodiments that may be implemented by the apparatus illustrated in FIG. 1. First, consider the embodiments that allow encryption of information being inputted from keypad 111 to be encrypted by keyboard 101. The encryption is performed on data being received from keypad 111 by processor 108 executing encryption routine 117. In one embodiment, encryption routine 117 is permanently stored in memory 109 utilizing read only memory (ROM), flash memory, etc. Any type of permanent memory known to one skilled in the art can be utilized for the storage of encryption routine 117. In another embodiment, encryption routine 117 is stored in random access memory located in memory 109, and the encryption routine is loaded from device reader 112. In another embodiment, the encryption routine 117 is downloaded from computer 102 from keyboard driver 126 or an application such as application 128. In yet another embodiment, encryption routine 117 is downloaded from a server such as server 106 executing application 139.

Once encryption routine 117 is stored, then a seed is utilized with encryption routine 117 to encrypt the data from keyboard 111. The seed may be entered manually on keyboard 111 by the user typing in information that the user had received in paper form or by observing the seed being displayed on console 120 by an application, such as applications 128-129 and 139-141 or keyboard driver 126. In another embodiment, the seed is received via device reader 112. In another embodiment, device reader 112 is reading a smart card such as the ActivCard Gold smart card manufactured by ActivCard Corp. To enable operation of the ActivCard, the user may need to enter a personal identification number (PIN) via keypad 111. Some indicators of indicators 110 may be utilized to indicate whether the correct PIN has been entered. Encryption routine 117 is responsive to the input from keypad 111 to enable the ActivCard in device reader 112 if the correct PIN has been received. One skilled in the art would readily see that an ActivCard could be utilized with device reader 125.

Keyboard 101, in particular processor 108, needs to determine when to start the encrypting process and when to terminate the encrypting process. In one embodiment, the encryption process is started when keyboard 108 is powered on. In another embodiment, the encryption process is started in response to a unique sequence of key actuations on keypad 111 by a user. This sequence may include, but is not limited to, multiple simultaneous key actuations. Indeed, multiple key actuations can be performed which are not normally allowed by processor 108 executing control routine 114 or by processor 119 executing keyboard driver 126. In another embodiment, an extra key is added to keypad 111 that is utilized to start and stop the encrypting process. In another embodiment, keypad 111 may have a special key reserved solely for starting and stopping the encryption process. In another embodiment, the encryption process is started when device reader 112 signals processor 108 that it has information to upload to processor 108. In another embodiment, the encryption process is started by a routine or application in computer 109 or server 106 signaling keyboard 101 that the encryption should be started. Encryption is ended using one of the methods indicated for starting the encryption.

In one embodiment, encryption is utilized only to protect limited amounts of personal or proprietary information such as a password, credit card number, social security number, account numbers, etc. However, in another embodiment, keyboard 108 can always encrypt information being sent so that all information coming from keyboard 101 is encrypted.

Next, consider where the decryption is performed for the encrypted information being received from keyboard 101. In one embodiment, keyboard driver 126 performs the decryption so that all information being received from keyboard 101 is decrypted after leaving keyboard driver 126. In another embodiment, decryption is performed by an application such as application 128 in memory 121. In yet another embodiment, the decryption is performed by an application such as application 139 in a server such as server 106. In addition, in another embodiment, computer 102 would utilize a specialized decryption routine stored in memory 121 but not illustrated in FIG. 1.

Figure 2:
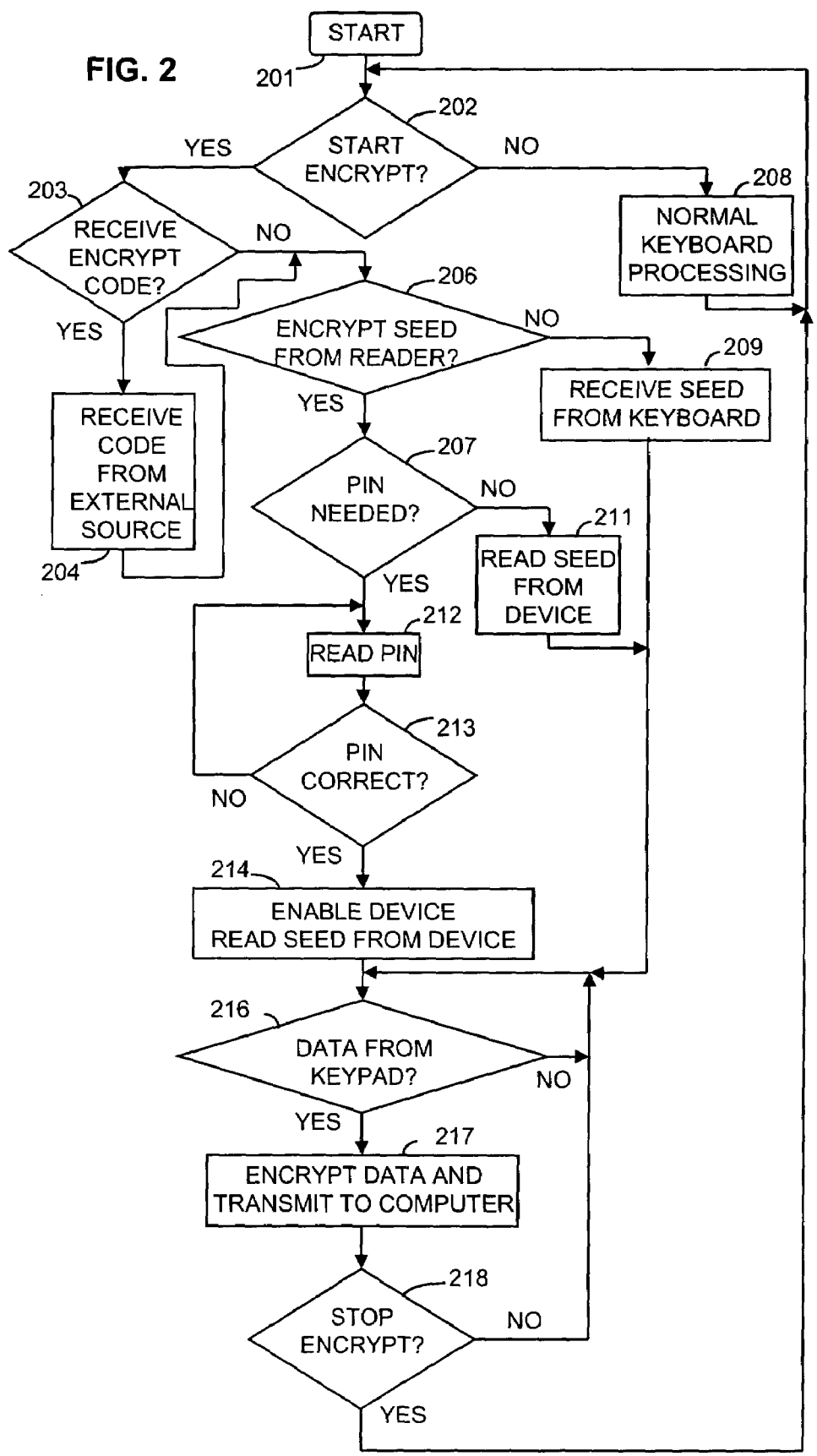
FIG. 2 illustrates, in flowchart form, various embodiments performed by a keyboard.

FIG. 2 illustrates, in flowchart form, embodiments of operations that are performed by a keyboard such as keyboard 101. After being started in block 201, decision block 202 determines if it is time to start performing the encryption operation. Decision block 202 can be responsive to a special key on keyboard 101, ennoblement of device reader 112, a special sequence entered by the user on keypad 111, or reception of a start encryption message from computer 102 or server 106 in the present examples. If decision block 202 determines that it is not time to start encrypting information entered on the keypad of the keyboard, control is transferred to block 208 which performs normal keyboard processing before transferring control back to decision block 202.

If decision block 202 determines that the encryption process is to start, control is transferred to decision block 203 to determine if the encryption code for an encryption routine such as encryption routine 117 is to be downloaded from an external source. In the various embodiments, this external source can be device reader 112, computer 102, or server 106. If the encryption code is to be downloaded from an external source, block 204 receives the encryption code and stores it within memory 109 of keyboard 101 before transferring control to decision block 206. If the encryption code is not to be received from an external source, decision block 203 transfers control to decision block 206.

Decision block 206 determines if the seed that will be utilized by an encryption routine within the keyboard such as encryption routine 117 will be received from a device reader connected directly to the keyboard or will be entered via the keypad on the keyboard. Note, that in another embodiment, the encryption seed is transmitted to processor 108 from either computer 102 or server 106 in the present example. If the encryption seed is not to be received from the device reader, block 209 receives the encryption seed from the keyboard. The user enters the encryption seed via the keyboard by either reading the encryption seed information from a piece of paper or from a message displayed on console 120 of computer 102 by an application running in either computer 102 or server 106. After receiving the encryption seed, block 209 transfers control to decision block 216.

Returning to decision block 206, if the encryption seed is to be read from the device reader, control is transferred to decision block 207. The latter decision block determines if a PIN is needed to enable the information from the device reader. Such a PIN is required in the case of the utilization of an ActivCard. If no PIN is required, decision block 207 transfers control to block 211 which reads the seed from the device reader before transferring control to decision block 216.

If decision block 207 determines that a PIN is needed, control is transferred to block 212 which reads the PIN from information entered from keypad 111 under control of processor 108. Decision block 213 determines if the PIN is correct. If the PIN is not correct, decision block 213 transfers control back to block 212. If the PIN is correct, decision block 213 transfers control to block 214. The latter block enables the device reader and reads the seed from the device reader. One skilled in the art would readily realize how a smart card such as the ActivCard would be enabled so that the seed could be read from such a smart card. After execution of block 214, control is transferred to decision block 216.

Decision block 216 determines if data has been received from the keypad. If the answer is no, control is returned to decision block 216. Note, although not illustrated, one skilled in the art would readily realize that the operations of decision block 216 would also include receiving data from computer 102 to perform such functions as controlling indicators 110 while decision block 216 is determining if data is being received from keypad 111. If the answer is yes in decision block 216, block 217 encrypts the data and transmits it to computer 102. In one embodiment, computer 102 will decrypt the data upon receipt. In another embodiment, the decryption of the data from block 217 will be performed by an application in a server such as server 106.

After execution of block 217, control is transferred to decision block 218 to determine if the encryption process should be stopped. The information that the encryption process should be stopped can be received in the same modes as the information that started the encryption process in decision block 202. If the answer in decision block 218 is no, control is transferred back to decision block 216. If the answer in decision block 218 is yes, control is transferred to decision block 202. Note, that the encryption process can be started by decision block 202 at any time and not necessarily when keyboard 101 is initially powered on. In addition, one skilled in the art would readily realize that a keyboard could respond to a variety of stimulus to start and stop the encryption process so that different applications and routines could utilize the capabilities of encrypting data by keyboard 101.

Figure 3:
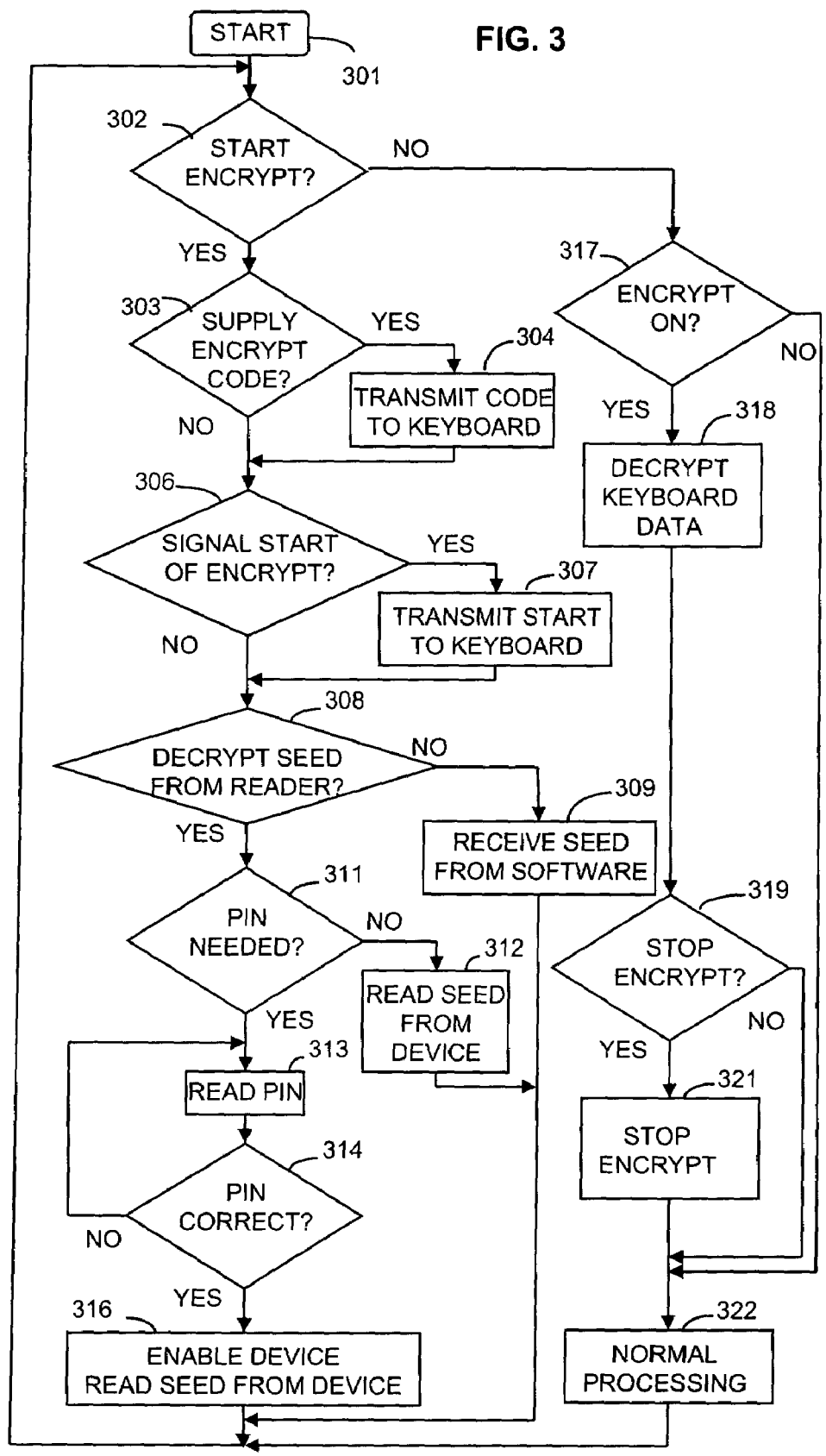
FIG. 3 illustrates, in flowchart form, various embodiments implemented by a computer to which a keyboard is connected.

FIG. 3 illustrates, in flowchart form, embodiments of operations that would be performed by a computer such as computer 102 connected to a keyboard. These operations can be performed by keyboard driver 126 or an application such as application 128. Processor 119 is executing the driver or application. After being started in block 301, decision block 302 determines if it is time to start the encryption process. If the answer is yes, decision block 303 determines if the encryption code that will be utilized by the keyboard is to be downloaded from computer 102. If the answer is yes, block 304 transmits the encryption code to the keyboard 101 before transferring control to decision block 306. If the answer in decision block 303 is no, control is transferred to decision block 306. The latter decision block determines whether computer 102 is to transmit a signal to keyboard 101 indicating that keyboard 101 is to start the encryption process. If the answer is no in decision block 306, control is transferred to decision block 308. If the answer is yes in decision block 306, block 307 transmits a start message to keyboard 101 before transferring control to decision block 308.

Decision block 308 determines if the decryption seed is to be obtained from a device reader such as device reader 125. If the answer is no, block 309 receives the decryption seed from software such as an application or keyboard driver 126 before transferring control back to decision block 302. If the answer in decision block 308 is yes, decision block 311 determines if a PIN is needed for operation of device reader 125. If the answer is no, block 312 reads the seed from the device in device reader 125 before transferring control back to decision block 302. If the answer is yes in decision block 311, block 313 reads the PIN which could be entered via the keyboard 101. Decision block 314 then determines if the PIN is correct before transferring control to block 316. If the PIN is not correct, block 313 is executed again. Block 316 enables the device and reads the decryption seed from the device in the device reader before transferring control back to decision block 302. One skilled in the art would immediately realize that blocks 302-316 could be performed in different orders.

Returning to decision block 302, if the answer is no, decision block 317 determines whether encryption is on. If the answer is no, control is transferred to block 322 which performs normal processing before returning control back to decision block 302. If the answer is yes in decision block 317, block 318 utilizes the decryption seed to decrypt any keyboard data that may have been received from keyboard 101 before transferring control to decision block 319. Decision block 319 determines whether it is time to stop the encryption process. If the answer is no, control is transferred to block 322. If the answer is yes in decision block 319, block 321 stops the encryption process before transferring control to block 322.

Figure 4:
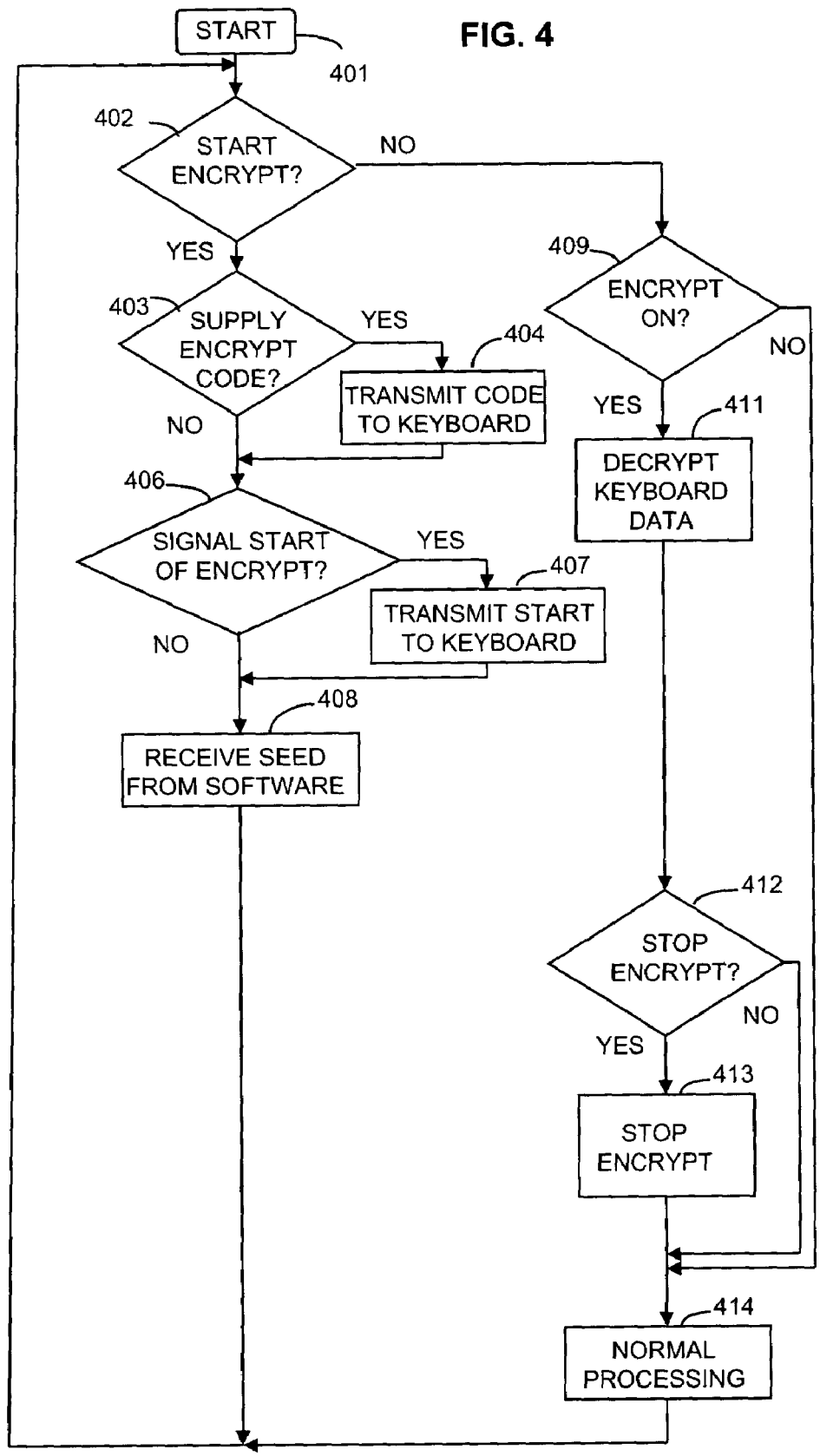
FIG. 4 illustrates, in flowchart form, various embodiments implemented by software being executed on a server.

FIG. 4 illustrates the operations that would be performed by a server such as server 106 during the execution of an application such as application 139. FIG. 4 illustrates various embodiments of the invention. After being started in block 401, decision block 402 determines if the encryption process should be started. If the answer is yes in decision block 402, decision block 403 determines whether the encryption code is to be downloaded from the server to the keyboard. If the answer is yes, block 404 downloads the encryption code before transferring control to decision block 406. If the answer is no in decision block 403, control is transferred to decision block 406. Decision block 406 determines if the software running on the server is to signal the keyboard to start performing encryption. If the answer is no, control is transferred to block 408. If the answer is yes in decision block 406, control is transferred to block 407 which transmits a start message to keyboard 101 before transferring control to block 408. Block 408 accesses the decryption seed from data stored in data 136 or built directly into the application being executed before transferring control back to decision block 402.

Returning to decision block 402, if the answer is no, decision block 409 determines if the encryption process is active. If the answer is no, control is transferred to block 414. If the answer is yes in decision block 409, block 411 decrypts any data being received from the keyboard before transferring control to decision block 412. The latter decision block determines if there is any type of an indication to stop the encryption process. Normally, an application utilizing the encrypted information would signal the stop of the encryption process. If the answer is no in decision block 412, control is transferred to block 414. If the answer is yes in decision block 412, block 413 stops the encryption process which will entail informing the software executing the operations illustrated in FIG. 4 and also transmitting a message to keyboard 101 to cease performing encryption before transferring control to block 414. Block 414 performs normal processing before transferring control back to decision block 402.

When the operations of devices 101, 102, or 106 are implemented in software, as is shown in FIGS. 2-4, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Devices 101, 102, or 106 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where devices 101, 102, or 106 are implemented in hardware, devices 101, 102, or 106 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modification to the illustrated embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for protecting data generated by a keyboard, comprising the steps of:
   reading data from a keypad of the keyboard;
   reading an encryption seed from a device reader directly connected to the keyboard;
   encrypting the read data using the encryption seed; and
   directly transmitting the encrypted data from the keyboard to a computer wherein the encrypted data is not transmitted via the device reader to the computer and the computer and the device reader are different devices.

2. The method of claim 1 further comprises the steps of receiving the transmitted encrypted data by the computer; and
   decrypting the received encrypted data by the computer.

3. The method of claim 1 wherein the step of transmitting comprises the step of using a wireless link over which the encrypted data is transmitted.

4. The method of claim 1 wherein the step of reading the encryption seed comprises the step of enabling the device reader with a personal identification number.

5. A method for protecting data generated by a keyboard, comprising the steps of:
   generating a start signal by at least one of a special key on a keypad of the keyboard or multi-actuation of a number of keys on the keypad;
   reading data from the keypad following generation of the start signal wherein the read data and the start signal are distinct;
   encrypting the read data in response to the start signal;
   transmitting the encrypted data from the keyboard to a computer;
   receiving a unique stop signal from the keypad;
   stopping the encryption of the read data and transmission of the encrypted data from the keyboard to the computer in response to the stop signal.

6. The method of claim 5 wherein the step of receiving the stop signal comprises the step of generating the stop signal by at least one of a special key on keyboard or multi-actuation of a number of keys on the keypad.

7. A keyboard for encrypting data before transmission to a computer directly connected to the keyboard via a link, comprising:
   an interface connected to the link;
   a memory;
   a keypad for generating the data;
   a device interface for reading a directly connected device reader to obtain a seed for an encryption routine wherein the device reader and the computer are different devices;
   a processor for encrypting using the seed from the device reader the generated data from the keypad by execution of the encryption routine stored in the memory; and
   directly transmitting the encrypted data to the computer via the interface and link bypassing the device reader and device interface.

8. The keyboard of claim 7 wherein the link is a wireless link.

9. The keyboard of claim 7 comprises a special key which when actuated causes the processor to at least start executing the encryption routine or stop executing the encryption routine.

10. A processor-readable medium for protecting data generated by a keyboard, comprising processor-executable instructions configured for:
   reading data from a keypad of the keyboard;
   reading an encryption seed from a device reader directly connected to the keyboard;
   encrypting the read data using the encryption seed; and
   directly transmitting the encrypted data from the keyboard to a computer wherein the encrypted data is not transmitted via the device reader to the computer and the computer and the device reader are different devices.

11. The processor-readable medium of claim 10 wherein the transmitting comprises using a wireless link over which the encrypted data is transmitted.

12. The processor-readable medium of claim 10 wherein the reading the encryption seed comprises enabling the device reader with a personal identification number.

13. A processor-readable medium for protecting data generated by a keyboard, comprising processor-executable instructions configured for:
   generating a start signal by at least one of a special key on a keypad of the keyboard or multi-actuation of a number of keys on the keypad;
   reading data from the keypad following generation of the start signal wherein the read data and the start signal are distinct;
   encrypting the read data in response to the start signal;
   transmitting the encrypted data from the keyboard to a computer;
   receiving a unique stop signal from the keypad;
   stopping the encryption of tile read data and transmission of the encrypted data from the keyboard to the computer in response to the stop signal.

14. The processor-readable medium of claim 13 wherein the stop signal generated by at least one of a special key on keyboard or multi-actuation of a number of keys on the keypad.

* * * * *